United States Patent
Campbell

[11] Patent Number: 5,957,164
[45] Date of Patent: Sep. 28, 1999

[54] REFRIGERANT HOSE

[75] Inventor: Scott Campbell, Sylvania, Ohio

[73] Assignee: Aeroquip Corporation, Maumee, Ohio

[21] Appl. No.: 09/150,785

[22] Filed: Sep. 10, 1998

[51] Int. Cl.$^6$ ..................................... F16L 11/08
[52] U.S. Cl. .................. 138/137; 138/140; 138/141; 138/126; 428/36.8; 428/36.91
[58] Field of Search ................... 138/137, 140, 138/141, 124–126; 428/36.2, 36.91, 36.8

[56] References Cited

U.S. PATENT DOCUMENTS

| | | |
|---|---|---|
| 4,091,843 | 5/1978 | Mikes et al. . |
| 4,096,888 | 6/1978 | Stefano et al. . |
| 4,559,095 | 12/1985 | Babbin . |
| 4,862,923 | 9/1989 | Kitami et al. . |
| 4,905,735 | 3/1990 | Akiyoshi ............................. 138/137 X |
| 4,907,625 | 3/1990 | Ito et al. .............................. 138/137 X |
| 4,998,564 | 3/1991 | Igarashi et al. ..................... 138/137 X |
| 5,016,675 | 5/1991 | Igarashi et al. . |
| 5,084,314 | 1/1992 | Igarashi et al. ..................... 138/137 X |
| 5,093,166 | 3/1992 | Nishimura .......................... 138/137 X |
| 5,246,778 | 9/1993 | Costemalle et al. ................... 138/141 |
| 5,264,262 | 11/1993 | Igarashi .............................. 138/137 X |
| 5,362,530 | 11/1994 | Kitami et al. . |
| 5,462,091 | 10/1995 | Saupe ..................................... 138/126 |
| 5,469,892 | 11/1995 | Noone et al. ....................... 138/137 X |
| 5,488,974 | 2/1996 | Shiota et al. . |
| 5,638,871 | 6/1997 | Iorio et al. . |

*Primary Examiner*—Patrick Brinson
*Attorney, Agent, or Firm*—Emch, Schaffer, Schaub & Porcello Co.

[57] ABSTRACT

This device is a hose for air conditioning purposes that is a barrier hose. The hose comprises an innermost tube of a thermoplastic vulcanizate. The innermost tube of thermoplastic vulcanizate is coextruded with a flexible polyamide barrier material as a second tube. A backing of thermoset rubber is extruded or calendared over the polyamide barrier tube. A reinforcement layer follows which is then covered with an EPDM outer cover.

15 Claims, 1 Drawing Sheet

REFRIGERANT HOSE

TECHNICAL FIELD

This invention relates to refrigerant hoses for automotive and industrial air conditioning and related components for piping, cooling, transporting and the like.

BACKGROUND ART

The automotive industry uses hoses for transporting refrigerants such as fluorohydrocarbons and chlorofluorohydrocarbons. There also has been a movement to use alternative refrigerants like carbon dioxide and propane which is creating a need for alternative hose materials. The hoses generally have a three-layer laminar construction consisting of an inner tube, an outer cover located radially outwardly of the inner tube, and a reinforcing fiber layer interposed between the inner tube and outer cover. Generally, the inner tube is formed of acrylonitrile-butadiene rubber (NBR) or chlorosulphonated polyethylene (CSM). The reinforcing fiber layer usually is a mesh structure formed by braided organic yarn such as polyester fiber, rayon fiber, or nylon fiber. The outer cover typically is formed of ethylene propylene diene rubber (EPDM) or chloroprene rubber (CR).

The known multi-layered hose has a high degree of flexibility. Because of this property of the rubber materials, the hose can be handled with ease. In addition, the hose is free from deterioration due to harmful metallic substances such as metallic ions and/or metal chlorides originating from metallic pipings used in a refrigerating or cooling circuit.

However, rubber materials generally tend to have high gas permeability, that is, low resistance to gas permeation. One attempt to improve resistance of conventional rubber hoses to refrigerant permeation is using nylon as one of the layers of the inner tube of the hose. Unfortunately, hoses with a nylon inner layer suffer from reduced flexibility. The nylon layer also is readily attacked by conveyed chemicals. I have found improved resistance to refrigerant permeation with my new barrier hose construction, as well as decreased leakage of refrigerants at the coupling/hose interface.

DISCLOSURE OF INVENTION

New resins have been engineered to broaden the range of combinations between soft, nonpolar and hard, rigid, polar products. Historically, these combinations could not be brought together through coextrusion, but only through an injection molding environment. Using higher processing temperatures and longer time of material contact, coextrusion of the TPV innermost layer and the nylon barrier layer can now be achieved. One now can achieve the performance of the thermoplastic vulcanizate and the advantages of nylon. The hose of my invention comprises an innermost tube of a thermoplastic vulcanizate. The innermost tube of thermoplastic vulcanizate is coextruded with a flexible polyamide barrier material as a second tube. A third tube of thermoset set rubber is extruded or calendared over the polyamide barrier tube without the need for chemical etching or liquid adhesives. A reinforcement layer follows which is then covered with an EPDM outer cover.

The innermost tube according to the invention is formed from a composition composed of a thermoplastic vulcanizate which contains a polyolefin resin and one or more rubbers selected from ethylene-propylene-diene or EPDM rubber and butyl-based rubbers.

Suitable thermoplastic vulcanizates fall within those meeting the following physical requirements as stipulated by ASTM D-638 and D-1566. The thermoplastic vulcanizate according to the invention shows a physical behavior as to vulcanized rubbers in common use and suits processing like general thermoplastic resins.

BEST MODE OF CARRYING OUT INVENTION

Figure 1:
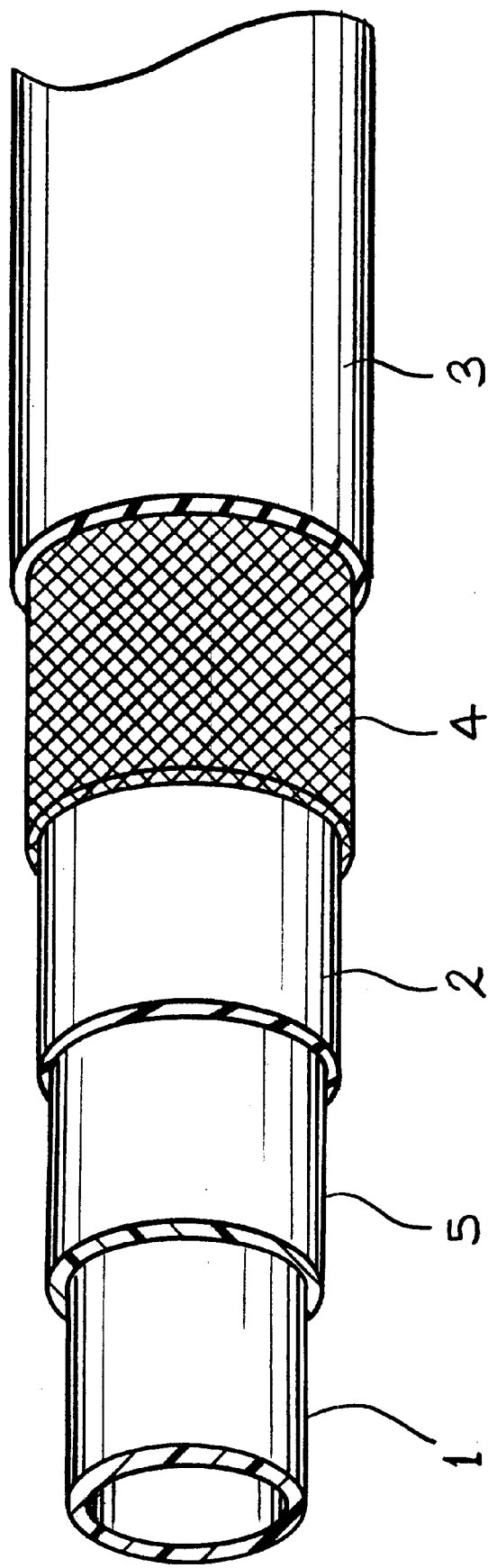
FIG. 1 is a perspective view of a refrigerant transporting hose of the present invention.

More specifically, my refrigerant transporting hose, which is a barrier hose, comprises an innermost tube formed of at least one thermoplastic vulcanizate and at least one backing layer positioned radially outwardly of the innermost tube formed of a polyamide material. Next is at least one backing layer positioned radially outwardly of the polyamide inner tube formed of a rubber material followed by a reinforcing layer positioned radially outwardly of the inner tube. Finally, an outer cover is positioned radially outwardly of the reinforcing layer made of a rubber material.

FIG. 1 shows a refrigerant transporting hose comprising innermost tube 1 made of a thermoplastic vulcanizate. Inner layer 5 made of polyamide is coextruded around tube 1. Backing layer 2 made of thermoset rubber covers tube 5. Reinforcing layer 4 is next and covered by outer cover 3 made of EPDM rubber.

More specifically, innermost tube 1 is typically a thermoplastic vulcanizate of a EPDM modified polyolefin material. Polypropylene is the particularly preferred polyolefin. These polyolefins have been modified to successfully bond to the nylon material during coextrusion in a chemical fashion.

EPDM is an elastomer based on stereospecific linear terpolymers of ethylene, propylene, and small amounts of a nonconjugated diene, e.g., a cyclic or aliphatic diene. The unsaturated part of the polymer molecule is pendant from the main chain, which is completely saturated. EPDM can be vulcanized with sulfur. Suitable dienes for the EPDM rubber in the thermoplastic vulcanizate are dicyclopentadiene, ethylidene norbornene, 1,4-hexadiene and the like.

Butyl-based rubbers as components for the thermoplastic vulcanizate or butyl or IIR rubber, chlorinated butyl or CI-IIR rubber, brominated butyl or Br-IIR rubber and the like. Better chosen is a CI-IIR rubber with an average molecular weight of about $35 \times 10^4$ to $45 \times 10^4$ and a chlorination ratio of about 1.1 to 1.3%.

The thermoplastic vulcanizate according to the invention is highly moisture-proof, heat aging-resistant, low creep, and weather-resistant and fully retentive of physical qualities at elevated temperature. As equivalents to such thermoplastic vulcanizates are commercially obtainable Advanced Elastomer System's Santoprene®, a polypropylene resin component and an EPDM rubber component both having been subject to curing, and Exxon's Trefsin in which polypropylene is used as the resin component and a combination of butyl-based rubber as the thermoset component.

Santoprene® and other thermoplastic vulcanizates provide excellent resistance to compression set. As a result, excellent coupling retention (sealing at the coupling) is achieved. A typical EPDM recipe is as follows:

| Material | Parts |
|---|---|
| EPDM Recipe | |
| EPDM | 93 |
| CSM (Chlorosulphonated Polyethylene) | 7 |
| High Reinforcing Black (Carbon Black) | 20 |
| Low Reinforcing Black (Carbon Black) | 65 |
| Silica | 20 |
| Ricobond ® 1756 | 10 |
| Antioxidant | 2 |
| Peroxide | 9 |
| Zinc Oxide | 5 |
| Resorcinol/Stearic Acid | 7.5 |
| Paraffinic Oil | 30 |
| | 271.5 |
| Typical Properties of TPV Polyolefin EPDM Innermost Layer | |
| Hardness | 70–85 (Shore A) |
| Specific Gravity | 0.980 |
| Tensile Strength | 960 psi |
| Elongation at Break | 240% |

Polyamide resins used for barrier layer 5 are chosen from homopolymers such as nylon 6, glass-reinforced nylon 6, blends of nylon 6 and nylon 6,6, nylon 12, and modified nylon 12 materials. The nylon 6 or nylon 12 materials can be modified with an appropriate polyolefin material to further promote adhesion to the TPV.
Typical Properties of Nylon 6 or Nylon 12 are:

| Barrier Material | |
|---|---|
| Specific Gravity | 1.08 |
| Tensile Strength | 5800 psi |
| Elongation At Break | 340% |
| Flexural Modules | 200,000 psi |
| Flexural Strength | 8000 psi |
| Hardness | 74 (D-Scale) |

Inner tube 2 consists of a single rubber layer or a plurality of rubber layers, which are formed of a rubber material such as ethylene propylene diene rubber (EPDM), chlorinated isobutylene-isoprene rubber (CI-IIR), chlorinated polyethylene (CPE), as well as a rubber material usually used for an inner layer of a rubber hose, such as acrylonitrile-butadiene rubber (NBR) or chlorosulphonated polyethylene (CSM). Preferably, inner tube 2 is a halogenated rubber such as bromobutyl rubber.

Reinforcing layer 4 may be a fiber layer as commonly used as a reinforcing layer of ordinary rubber hoses. For example, fiber layer 4 is formed by braiding, spiralling or knitting of yarn principally consisting of synthetic fiber such as glass fiber, steel fiber, polyester fiber or aramid fiber.

Outer cover 3 is made of the same material as inner tube 2 with EPDM being preferred.

In a preferred embodiment, an inner tube of Santoprene® (consisting of a continuous phase of polypropylene and cured EPDM elastomer) is coextruded with a flexible nylon 6 or nylon 12 (modified with polypropylene) barrier material. Manufacturing can be accomplished with or without the use of a mandrel material. A layer of EPDM or bromobutyl rubber is extruded or calendared over the barrier material. This thermoset rubber has been compounded in order to adhere to the thermoplastic barrier material without the need of chemical etching or liquid adhesives. The reinforcement is a filament polyester material chemically treated to adhere to the neighboring thermoset rubber materials. The cover of the hose consists of an EPDM-based thermoset material.

This construction offers the following unique processing characteristics. We can coextrude the thermoplastic rubber and thermoplastic barrier material. Also, we have no requirements for the utilization of liquid adhesives during manufacturing. The process also allows for the possibility of mandreless construction.

The advantage of using a TPV/nylon 6 or nylon 12 configuration in a hose construction are:

Operating temperature from −76 to 274° F. of composite.

No primers or adhesives needed for bonding or materials.

No need for a mandrel for construction.

Inner tube compatibility with various refrigerant fluids.

EXAMPLE I

Peel Strength-Santoprene®/Nylon Tubing:
Co-extruded tubing was produced with a Santoprene® inner tube in conjunction with a nylon backing layer.
Results:
The nylon was Capron 8203 (an extrusion grande of nylon 6).
Two grades of Santoprene® were analyzed: 291-60PA and 291-85PA.
Extrusion Data:
Extruder: Santoprene®—1¼" David Standard 24:1 L/D Nylon—1¼" David Standard 20:1 L10
Crosshead: GENCA Model E5450
Tooling: Pin—0.728" OD Die—0.900" ID
Temperature Profile/Conditions:

| | Zone 1 | Zone 2 | Zone 3 | Zone 4 | Head | Die | RPM |
|---|---|---|---|---|---|---|---|
| 1½" Davis Std. | 355F | 365F | 385F | 395F | 465F | 450F | 62 |
| 1" GENCA | 525F | 550F | 550F | — | | 30 | |

Test Procedure:
The tube samples were split and the nylon cover stock was separated from the Santoprene® approximately one inch from the end of the sample to accommodate the tensile tester grips.
Results:

| Construction: | 291-60PA Capron 8203 | 291-85PA Capron 8203 |
|---|---|---|
| Peel Strength (lbs/inch) | | |
| Sample A | 13.0 | 15.2 |
| Sample B | 17.8 | 22.7 |
| Sample C | 15.1 | 16.2 |
| AVE. | 15.3 | 18.0 |

The adhesion property of both inner tube configurations is excellent. Most refrigeration specifications require a larger adhesion value (6 to 10 lb$_f$/in) between the innermost rubber and thermoplastic backing layer. The above data shows the hose of this invention having even higher peel strengths.

EXAMPLE II

I had a barrier hose constructed according to Example I with the following stipulations:

Santoprene® inner tube, modified nylon 12 barrier layer, EPDM backing layer, filament polyester reinforcement, and EPDM cover material. A rubber EPDM mandrel was used for construction purposes.

Special Processing Notes:
1. Coextrusion of 191-85PA Santoprene® and X51283 Nylon 12 (supplied by EMS American Grilon, Inc.) on an EPDM mandrel (0.600"). Santoprene® was dried for 6 hours at 176° F. and the nylon at 6 hour for 176° F. Santoprene® extrusion profile—360° F. to 480° F. with a melt temperature of 500° F. X51283 extrusion profile—400° F. to 435° F. with a melt temperature of 455° F.
2. Extrude a thin backing layer of EPDM (with Bonding Agent—Aeroquip Part #30992(-).
3. Braid (24 carrier Karg) 1000/2-3 of Magnaweld treated filament polyester supplied by Bibb®.
4. Extrude EPDM cover.
5. Wrap and cure.

Special Procedures or Data Requirements:
Dimensions:
I.D.—0.600"
Tube—0.030" gage
Barrier—0.010" gage
Backing—0.015" gage
Cover—0.075" gage Santoprene® 191-85PA and Nylon 12 X51283) Coextrusion The nylon was processed at 20 RPM on the 1.25 inch Genca extruder. The Santoprene® was processed at 52.8 RPM on the 1.25 inch Davis Standard extruder. The braiding operation produced 40 picks/5 inches. The temperatures of the EPDM extrusion ranged from 150° C. (zone 1) up to 190° C. (zone 4 with a die/melt temperature of 190° C.). The hose was appropriately wrapped prior to the cure cycle and the hose was cured at 315° F. for 30 minutes. The results show that during the adhesion testing of the Santoprene® and nylon 12 materials, the layer of Santoprene® adhered quite well to the barrier material. In short, the Santoprene® material is bonded to the nylon 12 adequately. The dimensional integrity of the Santoprene® following the cure cycle appeared to remain intact. The Santoprene® did appear to flow during the cure cycle causing the nylon barrier material to begin to flow into the interstitial voids created by the braid. Also, the EPDM cover material adhered well to the braid.

EXAMPLE III

I had another hose constructed according to Example II except that the backing layer between the nylon and braid was bromobutyl rubber. The bromobutyl rubber adhered well to the nylon layer, but not as well as the EPDM of Example II. Since the bromobutyl rubber did not adhere as well to the nylon barrier material, the hose construction preferred is a backing layer of EPDM (with Ricobond®).

In addition to the embodiments discussed above, it will be clear to persons skilled in the art that numerous modifications and changes can be made to the above invention without departing from its intended spirit and scope.

I claim:

1. A refrigerant transporting hose, which is a barrier hose comprising:
   an innermost tube formed of at least one thermoplastic vulcanizate;
   at least one barrier material positioned radially outwardly of the innermost tube formed of a polyamide material;
   at least one backing material positioned radially outwardly of the polyamide inner tube formed of a rubber material;
   a reinforcing layer positioned radially outwardly of the inner tube; and
   an outer cover positioned radially outwardly of the reinforcing layer made of a rubber material, wherein the innermost tube of the thermoplastic vulcanizate and polyamide barrier material are coextruded without the use of an adhesive.

2. A hose according to claim 1 wherein the thermoplastic vulcanizate is a polyolefin and a rubber selected from the group consisting of EPDM rubber and butyl based rubbers.

3. A hose according to claim 1 wherein the thermoplastic vulcanizate is polypropylene and EPDM rubber.

4. A hose according to claim 1 wherein the polyamide inner tube is straight nylon 6 or a modified nylon 6.

5. A hose according to claim 1 wherein the polyamide inner tube is nylon 6.

6. A hose according to claim 1 wherein the rubber inner tube is EPDM or a halogenated butyl rubber.

7. A hose according to claim 1 wherein the rubber inner tube is bromobutyl rubber.

8. A hose according to claim 1 wherein the reinforcing layer is braided, spiralling or knitted yarns.

9. A hose according to claim 1 wherein the reinforcing layer is made of braided, polyester fibers.

10. A hose according to claim 1 wherein the outer cover is EPDM rubber or a halogenated butyl rubber.

11. A hose according to claim 1 wherein the rubber inner tube is EPDM rubber.

12. A hose according to claim 1 wherein the outer cover is EPDM rubber.

13. A refrigerant transporting hose, which is a barrier hose comprising:
    an innermost tube formed of a thermoplastic vulcanizate of polypropylene and EPDM rubber;
    at least one inner tube positioned radially outwardly of the innermost tube formed of nylon 6 or nylon 12;
    at least one inner tube positioned radially outwardly of the polyamide inner tube formed of EPDM rubber;
    a reinforcing layer formed of polyester braid positioned radially outwardly of the rubber inner tube; and
    an outer cover positioned radially outwardly of the reinforcing layer made of EPDM rubber, wherein the innermost tube of the thermoplastic vulcanizate and inner tube of nylon are coextruded without the use of an adhesive.

14. A refrigerant transporting hose, which is both a barrier hose comprising:
    an innermost tube formed of a thermoplastic vulcanizate of polypropylene and EPDM rubber;
    at least one inner tube positioned radially outwardly of the innermost tube formed of nylon 6 or nylon 12;
    at least one inner tube position radially outwardly of the polyamide inner tube formed of bromobutyl rubber;
    a reinforcing layer formed of polyester braid positioned radially outwardly of the rubber inner tube; and
    an outer cover positioned radially outwardly of the reinforcing layer made of EPDM rubber, wherein the innermost tube of the thermoplastic vulcanizate and inner tube of nylon are coextruded without the use of an adhesive.

15. A hose according to claim 8 wherein the yarns are made of glass, steel, polyester, aramid, nylon or rayon fibers.

* * * * *